United States Patent [19]

Flick et al.

[11] Patent Number: 5,522,625

[45] Date of Patent: Jun. 4, 1996

[54] COUPLING DEVICE

[75] Inventors: David L. Flick, Lee's Summit; Perry J. Parkhurst, Pleasant Hill; Lauren W. Burnett, Lee's Summit, all of Mo.

[73] Assignee: Hoechst Marion Roussel, Inc., Cincinnati, Ohio

[21] Appl. No.: 346,378

[22] Filed: Nov. 29, 1994

[51] Int. Cl.$^6$ ....................................................... F16L 23/00
[52] U.S. Cl. .............................. 285/409; 24/279; 285/367; 285/411; 285/410
[58] Field of Search ................. 24/270, 279; 292/256.67, 292/256.73, 256.75; 285/420, 410, 411, 366, 367, 409

[56] References Cited

U.S. PATENT DOCUMENTS

| | | | |
|---|---|---|---|
| 1,901,699 | 3/1933 | Burpee | 292/236.67 |
| 2,602,678 | 7/1952 | Mahoff et al. | 785/367 |
| 2,837,383 | 6/1958 | Skelly | 283/367 |
| 2,915,800 | 12/1959 | Graff et al. | 24/279 |
| 2,937,893 | 5/1960 | Hill et al. | 285/410 |
| 2,941,273 | 6/1960 | Skelly | 24/279 |
| 3,157,932 | 11/1964 | Kyrias | 24/279 |
| 3,181,901 | 5/1965 | Watts | 285/367 |
| 3,600,770 | 8/1971 | Halling | 285/411 |
| 3,797,078 | 3/1974 | LaPointe | 285/367 |
| 3,797,079 | 3/1974 | Nixon | 285/411 |
| 4,341,406 | 7/1982 | Abbes et al. | |
| 4,568,115 | 2/1986 | Zimmerly | |
| 4,657,284 | 4/1987 | Fiori | |
| 4,739,542 | 4/1988 | Krzesicki | |
| 4,919,453 | 4/1990 | Halling et al. | |
| 5,170,540 | 12/1992 | Oetiker | |

FOREIGN PATENT DOCUMENTS

| | | |
|---|---|---|
| 1266578 | 6/1961 | France . |
| 1403430 | 5/1965 | France . |
| 3215382 | 10/1983 | Germany . |
| 736879 | 9/1955 | United Kingdom . |
| 851954 | 10/1960 | United Kingdom .......... 285/410 |
| 1019322 | 2/1966 | United Kingdom . |

*Primary Examiner*—Eric K. Nicholson
*Attorney, Agent, or Firm*—Killworth, Gottman, Hagan & Schaeff

[57] ABSTRACT

A coupling device is provided for coupling peripheral flanges of first and second pipes. The device comprises first and second arcuate retaining members, coupling structure and a latching mechanism. The coupling device is capable of being initially set via the latching mechanism so as to permit the coupling device to securely couple two pipe flanges of a given diameter. After being initially set, the device is capable of being easily and quickly disassembled and reassembled about the peripheral flanges of the two pipes.

20 Claims, 5 Drawing Sheets

COUPLING DEVICE

BACKGROUND OF THE INVENTION

The present invention relates generally to a device for coupling the peripheral flanges of two pipes.

It is known in the prior art to clamp fluid carrying tubings and pipes together by way of circular coupling devices. Typically, the ends of each section of pipe are formed with a circumferential flange. The face of one flange is flat for providing sealing contact with the face of an adjacent pipe flange. Gaskets may also be employed to enhance sealing. The coupling device encircles and engages the pipe flanges to effect the coupling of the pipes to one another.

Prior art coupling devices are typically comprised of at least two retaining members, each having a groove extending from a first end to a second end for receiving portions of the flanges of the two pipes. Coupling structure is provided for connecting first ends of the retaining members to one another. Various latching mechanisms have been employed in the past to tightly but detachably fasten the second ends of the two retaining members to one another, thus drawing the two pipe flanges into tight sealing abutting contact. For example, it is known to pivotably connect to the second end of a first retaining member a bolt having a wing nut threadedly associated therewith while providing a slot in the second end of the second retaining member. The bolt is adapted to be received in the slot in the second retaining member. Once the retaining members have been positioned about the pipe flanges and the bolt has been received in the slot, an operator rotates the nut to tightly clamp the retaining members about the flanges of the two pipe sections, thus drawing the two pipe flanges into sealing contact with one another.

The disadvantage of a coupling device having the aforementioned latching mechanism is that an operator is required to rotate the nut numerous times to effect the coupling of the pipe flanges to one another. The repetitive wrist motion involved in rotating the nut results in operator fatigue and injury.

Accordingly, a need exists for a coupling device that may be more easily and quickly assembled than is presently possible.

SUMMARY OF THE INVENTION

This need is met by the present invention, whereby an improved coupling device is provided which can be easily and quickly assembled about peripheral flanges of two pipes. The coupling device of the present invention is capable of being initially set to a given pipe coupling diameter so as to securely couple two given pipes to one another. Thereafter, the coupling device can be easily and quickly disassembled and reassembled about the peripheral flanges of those two pipes with little or no repetitive wrist motion.

In accordance with a first aspect of the present invention, a device is provided for coupling peripheral flanges of first and second pipes. The device comprises first and second arcuate retaining members, coupling structure and a latching mechanism. Each of the first and second arcuate retaining members has a first end, a second end, and an inner surface. The inner surface of each of the retaining members receives a portion of the peripheral flange of each of the first and second pipes. The coupling structure serves to couple the first ends of the first and second retaining members together. The latching mechanism acts to couple the second ends of the first and second retaining members together and to move the second ends toward one another. The latching mechanism includes a pivotal member coupled to the second end of the first retaining member. A locking device is associated with the pivotal member and is adapted to engage a portion of the second end of the second retaining member for effecting movement of the second ends of the first and second retaining members toward one another. The latching mechanism further includes a containment member for receiving an intermediate portion of the locking device. The containment member acts to releasably maintain the pivotal member in a closed position and the locking device in a locked position when the locking device is positioned to securely couple the flanges of the first and second pipes to one another.

The containment member is fixedly connected to the second retaining member intermediate the first and second ends of the second retaining member. The containment member has a generally arcuate shape and extends out from the second retaining member. The containment member has a slot located in the end opposite to the second retaining member for receiving the intermediate portion of the locking device.

The locking device comprises a threaded bolt, a gripping portion, a spring and a pin. The threaded bolt has a threaded section and a proximal head section including a slot. A portion of the threaded section defines the intermediate portion of the locking device. The gripping portion has a bore through which the threaded section of the bolt extends and a recess which communicates with the bore and receives the head section of the bolt. The spring is positioned in the recess and interposed between a section of the gripping portion and the head section of the bolt for biasing the head section in a direction away from the bore. The pin is received in the slot in the head section for preventing the bolt from completely exiting the gripping portion.

A recess is defined about the slot in the containment member for receiving an outer shoulder portion of the gripping portion.

The pivotal member may comprise a link assembly. The link assembly has first and second ends. The first end is pivotally coupled to the second end of the first retaining member via a first pin. The second end has a pivotable nut coupled thereto via second pins. The nut threadedly receives the threaded section of the bolt.

The portion of the second end of the second retaining member comprises a recessed section adapted to receive a distal end of the threaded section of the bolt.

The coupling structure comprises a link pivotally connected to the first ends of the retaining members via first and second pins.

In accordance with a second aspect of the present invention, a device is provided for coupling peripheral flanges of first and second pipes to one another. The device comprises first and second arcuate retaining members, coupling structure, and a latching mechanism. Each of the first and second retaining members has a first end, a second end, and an inner surface. The inner surface of each retaining member receives portions of the peripheral flanges of the first and second pipes. The coupling structure couples the first ends of the first and second retaining members together. The latching mechanism is adapted to couple the second ends of the first and second retaining members together and to move the second ends toward one another. The latching mechanism includes a pivotal member coupled to the second end of the first retaining member. A locking device is associated with the pivotal member and is adapted to engage a portion of the second end of the second retaining member for effecting movement of the second ends of the first and second retaining members toward one another. The latching mechanism further includes a containment member for releasably receiving a first intermediate portion of the locking device when the pivotal member has been moved toward the second retaining member and for releasably receiving a second intermediate portion of the locking device when the locking device is moved to a locking position such that the flanges of the first and second pipes are securely coupled to one another.

It is an object of the present invention to provide a coupling device which is capable of being easily and quickly assembled about peripheral flanges of two pipes. It is another object of the present invention to provide a coupling device which is capable of being initially set to a given pipe coupling diameter so as to securely couple two pipes to one another and thereafter be quickly and easily disassembled and reassembled about the peripheral flanges of the two pipes.

DETAILED DESCRIPTION OF THE INVENTION

Figure 1:
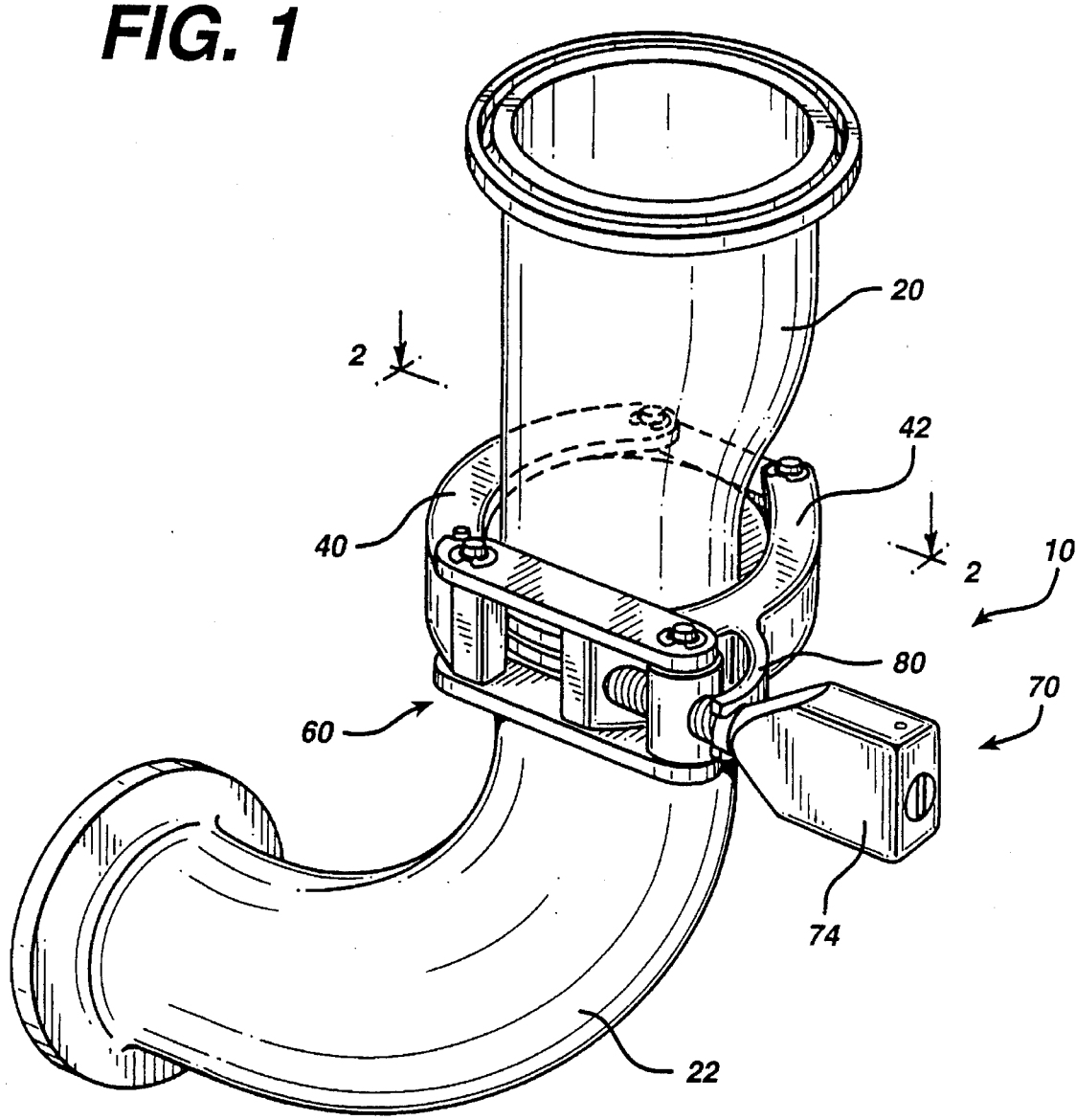
FIG. 1 is a perspective view of a coupling device constructed in accordance with the present invention.
Figure 2:
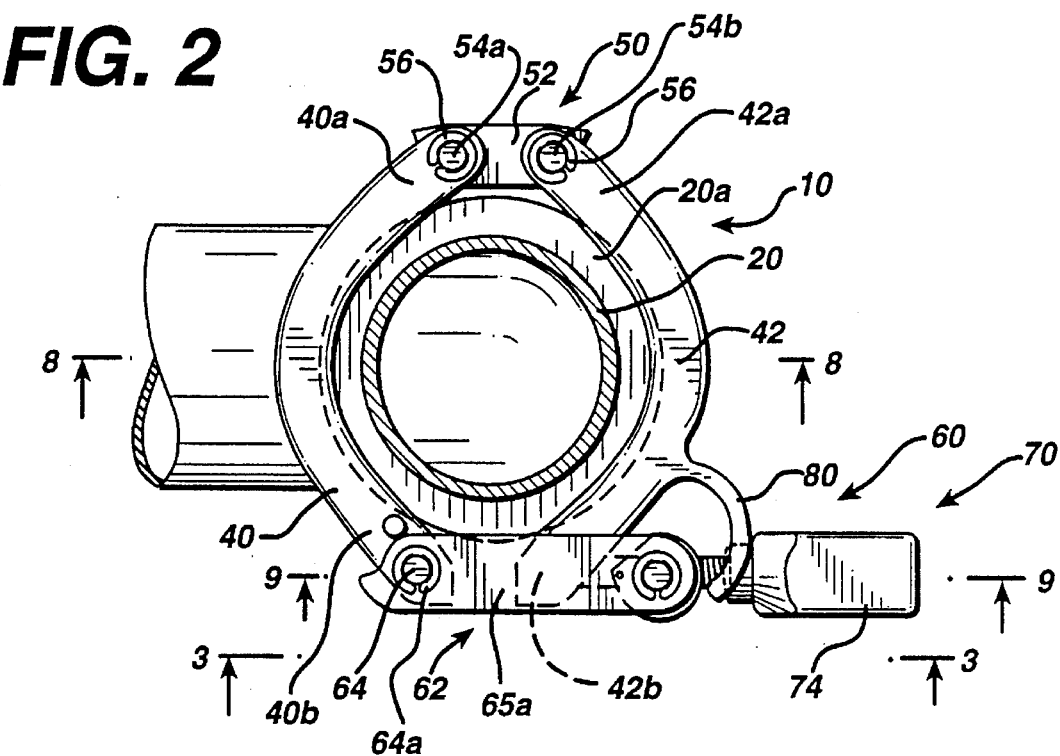
FIG. 2 is a view taken along section line 2—2 in FIG. 1.
Figure 3:
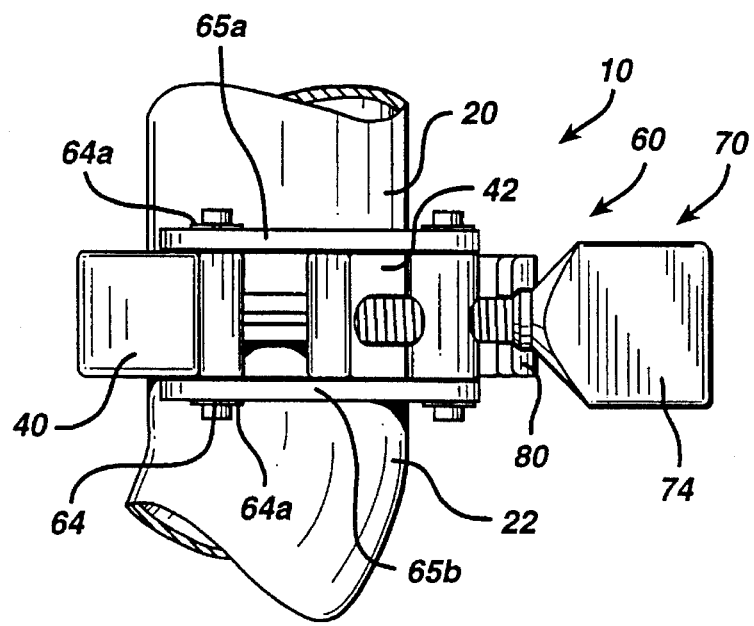
FIG. 3 is a view taken along view line 3—3 in FIG. 2.
Figure 8:
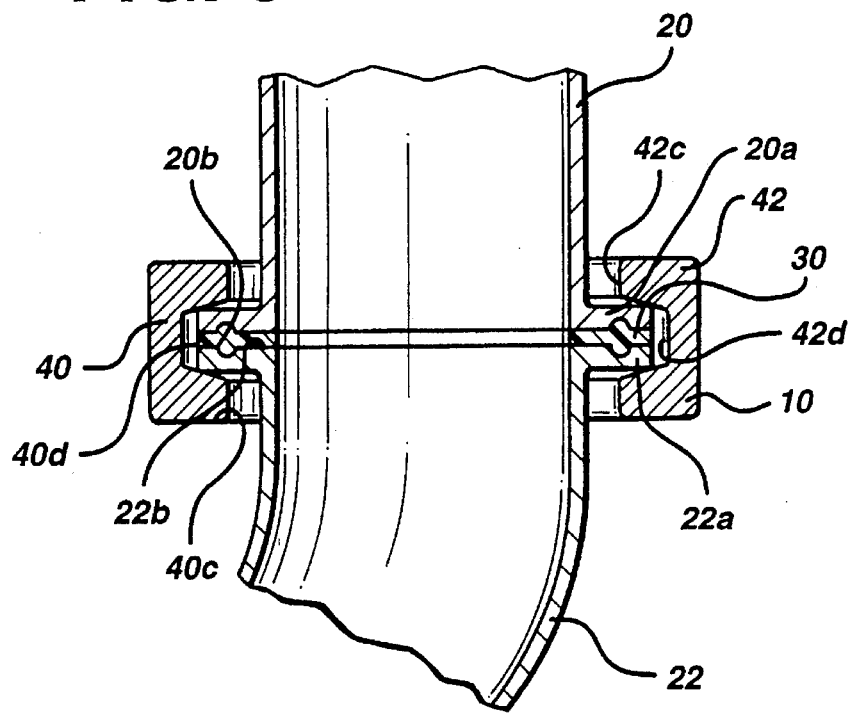
FIG. 8 is a sectional view showing the pipe flanges and intermediate seal in abutting clamping position after the coupling device of the present invention has been tightly fitted about the pipe flanges; and, FIG. 9 is a sectional view taken along section line 9—9 in FIG. 2.

A coupling device 10 constructed in accordance with the present invention is shown in FIGS. 1, 2, and 8 secured about peripheral flanges 20a and 22a of first and second pipes 20 and 22 for coupling the pipes 20 and 22 to one another. The flanges 20a and 22a of the two pipes 20 and 22 have generally flat opposing faces 20b and 22b, see FIG. 8. A seal 30 is positioned between the opposing faces 20b and 22b in the illustrated embodiment to seal the opposing faces 20b and 22b to one another when the pipes 20 and 22 are securely coupled via the coupling device 10.

Figure 4:
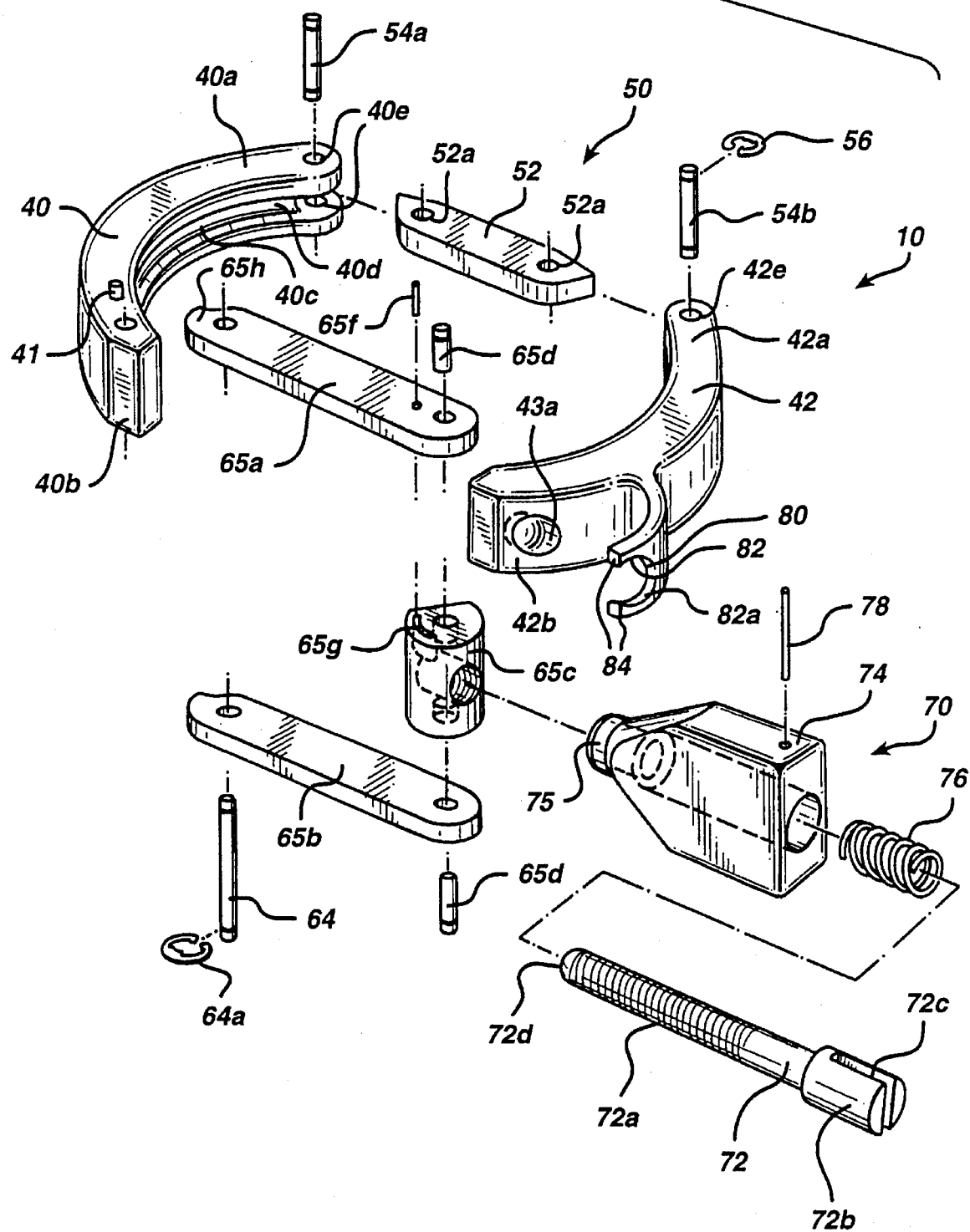
FIG. 4 is an exploded view of the coupling device shown in FIG. 1.

The coupling device 10 includes first and second arcuate retaining members 40 and 42, see FIGS. 1, 2, and 4. The first retaining member 40 has a first end 40a, a second end 40b, and an inner surface 40c. Similarly, the second retaining member 42 has a first end 42a, a second end 42b, and an inner surface 42c. The inner surfaces 40c and 42c are provided with tapered grooves 40d and 42d which receive portions of the peripheral flanges 20a and 22a when the pipes 20 and 22 are coupled together, see FIG. 8.

The first ends 40a and 42a of the first and second retaining members 40 and 42 are pivotably coupled together via coupling structure 50, see FIGS. 2 and 4. In the illustrated embodiment, the coupling structure 50 comprises a linkage 52, first and second pins 54a and 54b, and four C-rings 56. The first and second pins 54a and 54b extend through corresponding bores 40e, 42e and 52a provided in the first ends 40a and 42a of the retaining members 40 and 42 and the linkage 52. The C-rings 56 are fitted onto opposing ends of each of the pins 54a and 54b for securing the pins 54a and 54b in position.

Figure 9:
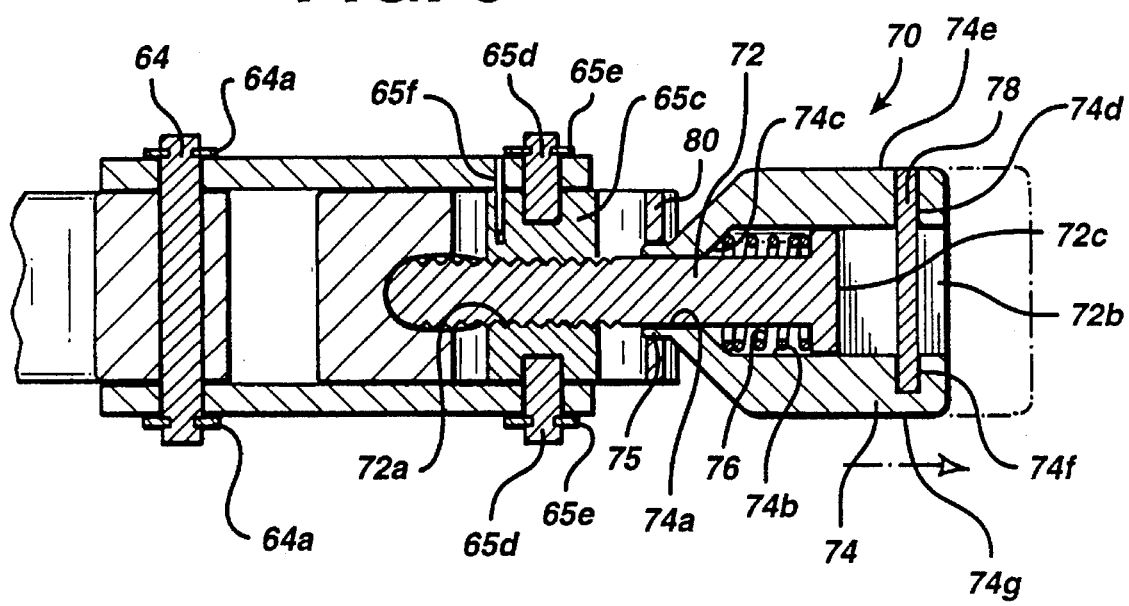

A latching mechanism 60 couples the second ends 40b and 42b of the first and second retaining members 40 and 42 to one another and also serves to move the second ends 40b and 42b toward one another, see FIGS. 1, 2, and 4. The latching mechanism 60 includes a link assembly 62 pivotably coupled to the second end 40b of the first retaining member 40 via a pin 64, see FIGS. 2 and 4. Two C-rings 64a are fitted onto opposite ends of the pin 64 to secure the pin 64 in position. In the illustrated embodiment, the link assembly 62 comprises first and second link members 65a and 65b and a pivotable nut 65c interposed between the link members 65a and 65b. Two pins 65d are press fitted into the nut 65c and couple the nut 65c to the link members 65a and 65b. C-rings 65e are fitted onto outer ends of the pins 65d to maintain the pins 65d in retaining position, see FIG. 9. A stop pin 65f is press fitted into link member 65a and is received within an arcuate slot 65g provided in the pivotable nut 65c to limit the angular movement of the pivotable nut 65c, see FIGS. 4, 7, and 9.

Figure 7:
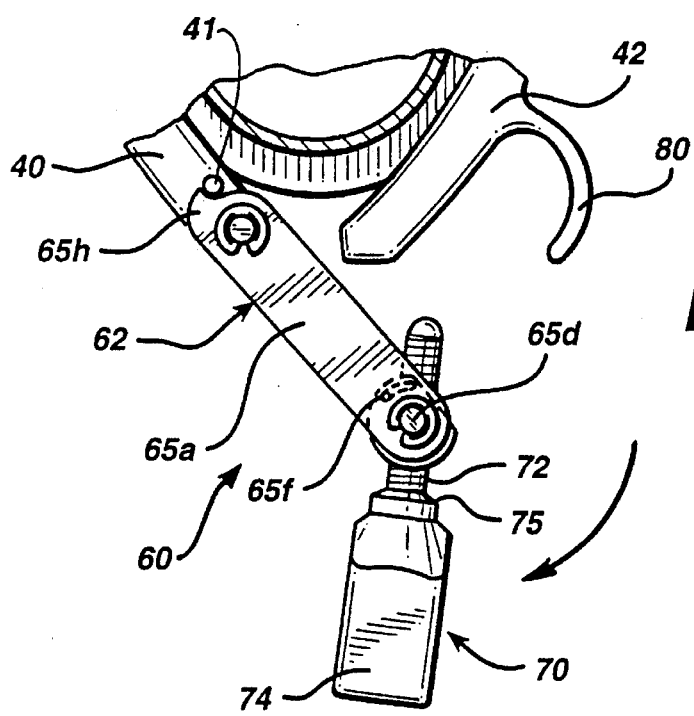
FIG. 7 is a view similar to FIG. 6 but with the coupling device in a released position.

A stop pin 41 extends from an outer surface of the first retaining member 40 and is engageable with an outer ear portion 65h provided on the first link 65a for limiting the angular movement of the link assembly 62, see FIG. 7.

A locking device 70 is associated with the link assembly 62 and is adapted to engage a recessed section 43a of the second retaining member 42 for effecting movement of the second ends 40b and 42b toward one another, see FIGS. 1–4 and 6. The locking device 70 comprises a threaded bolt 72, a gripping portion 74, a spring 76, and a pin 78, see FIG. 9. The threaded bolt 72 has a threaded section 72a and a proximal head section 72b including a slot 72c. The gripping portion 74 has a bore 74a through which the threaded section 72a of the bolt 72 extends and a recess 74b which communicates with the bore 74a. The head section 72b of the bolt 72 is received in the recess 74b. The spring 76 is positioned in the recess 74b and interposed between an inner, base section 74c of the gripping portion 74 and the head section 72b of the bolt 72 for biasing the head section 72b in a direction away from the bore 74a. The pin 78 is press fitted into a bore 74d in a first side wall 74e of the gripping portion 74. The pin 78 passes through the slot 72c in the head section 72b and is seated in a recess 74f in a second side wall 74g of the gripping portion 74. The pin 78 prevents the bolt 72 from completely exiting the gripping portion 74.

Figure 5:
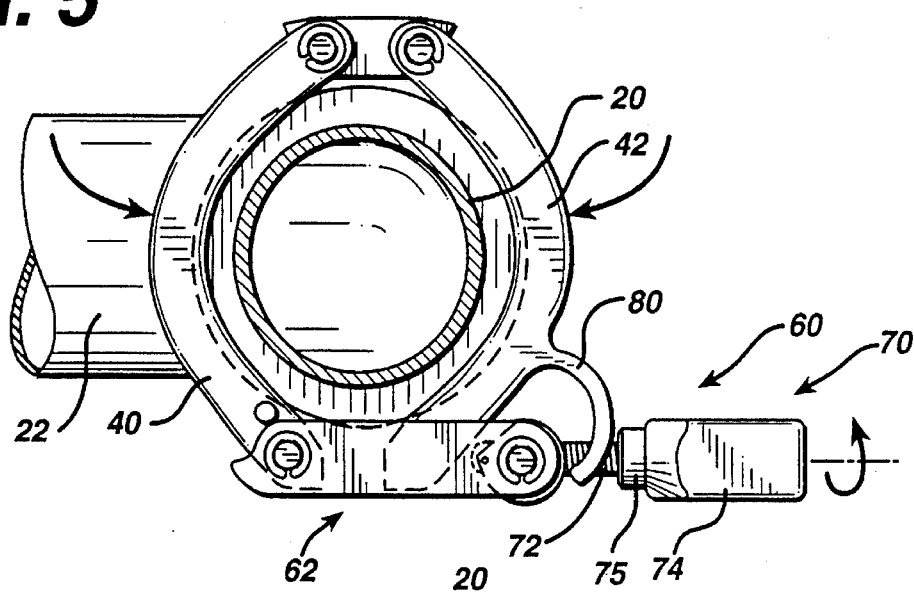
FIG. 5 is a view similar to FIG. 2 with the coupling device positioned about first and second pipe flanges but before the coupling device has been tightly clamped about the pipe flanges.

The latching mechanism 60 further includes a containment member 80, which, in the illustrated embodiment, is integral with the second retaining member 42 and positioned intermediate the first and second ends 42a and 42b of the second retaining member 42. The containment member 80 is arcuate in shape and has a slot 82 formed in its end opposite to the second retaining member 42. A recess 82a is defined about the slot 82 for receiving an outer shoulder portion 75 of the gripping portion 74, see FIGS. 4 and 6. The containment member 80 receives the threaded section 72a of the bolt 72 when the link assembly 62 is moved to a closed position, as shown in FIG. 5. The containment member 80 also receives the outer shoulder portion 75 of the gripping portion 74 within the recess 82a of the slot 82 when the locking device 70 is moved to a locking position, see FIG. 6, such that the first and second pipes 20 and 22 are securely coupled to one another.

Coupling of the first and second pipes 20 and 22 via the coupling device 10 is effected in the following manner. The device 10 is positioned about the flanges 20a and 22a of the first and second pipes 20 and 22 such that the flanges 20a and 22a are received within the grooves 40d and 42d provided in the first and second retaining members 40 and 42. The link assembly 62 is pivoted to permit a distal end 72d of the threaded section 72a of the bolt 72 to engage within the recessed section 43a of the second retaining member 42. The gripping portion 74 is then pivoted towards the containment member 80 until the threaded portion 72a of the bolt 72 and/or the shoulder portion 75 of the gripping portion is received within the slot 82 in the containment member 80, see FIG. 5.

Figure 6:
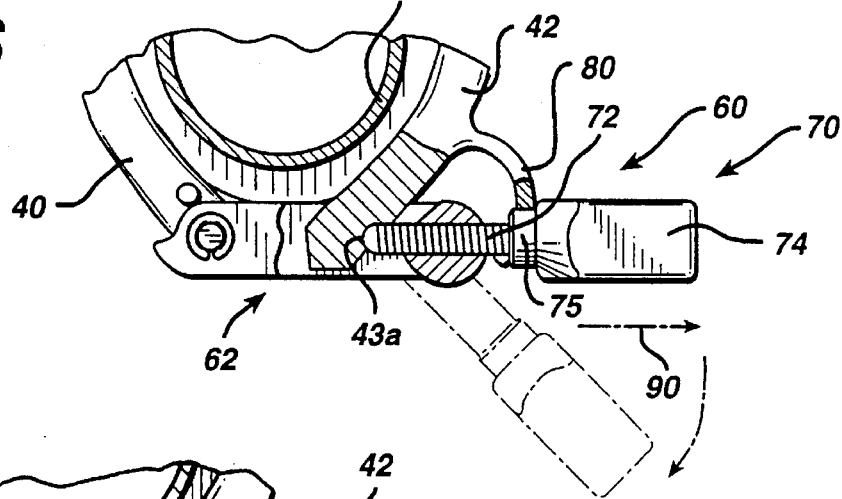
FIG. 6 shows a portion of the coupling device illustrated in FIG. 5 but after the coupling device has been tightened about the pipe flanges.

When the coupling device 10 is initially installed about two pipe flanges 20a and 22a, an operator must rotate the gripping portion 74, see FIG. 5, to cause the first and second ends 40b and 42b to move towards one another until the coupling device 10 is tightly positioned about the pipe flanges 20a and 22a. As the gripping portion 74 and, hence, the bolt 72 are rotated, the tapered inner grooves 40d and 42d of the first and second retaining members 40 and 42 draw the flanges 20a and 22a and the seal 30 into tight sealing abutting contact. When the coupling device 10 is tightly positioned about the pipe flanges 20a and 22a, the shoulder portion 75 is seated within the recess 82a as shown in FIG. 6.

After the coupling device 10 has been initially fitted onto the flanges 40a and 42a, an operator can thereafter disassemble the coupling device 10 by moving the gripping portion 74 against the biasing force of the spring 76 in a direction (indicated by arrow 90 in FIG. 6) away from the containment member 80 so as to disengage the outer shoulder portion 75 from the recess 82a defined in the slot 82. The locking device 70 is then pivoted away from the containment member 80, as shown in phantom in FIG. 6 and in FIG. 7, and the coupling device 10 is removed from the pipe flanges 20a and 22a. Reassembly is effected by positioning the coupling device 10 about the flanges 20a and 22a, pivoting the link assembly 62 toward the second retaining member 42 to allow the distal end 72d of the threaded section 72a to engage within the recessed section 43a of the second retaining member 42, and moving the gripping portion 74 toward the containment member 80 to allow the outer shoulder portion 75 to move along outer sections 84 of the containment member 80 which define the slot 82 until the shoulder portion 75 is seated within the recess 82a defined in the slot 82, see FIGS. 2, 6 and 9. Of course, loosening or tightening of the coupling device 10 via the gripping portion 74 may need to occur from time to time after initial installation. When the coupling device 10 is initially installed on a different set of pipes (not shown), adjustment of the coupling device 10 via rotation of the gripping portion 74 will normally be required.

Having described the invention in detail and by reference to a preferred embodiment thereof, it will be apparent that modifications and variations are possible without departing from the scope of the invention defined in the appended claims.

What is claimed is:

1. A device for coupling peripheral flanges of first and second pipes comprising:

first and second arcuate retaining members each having a first end, a second end, and an inner surface, said inner surface of each of said retaining members receiving a portion of the peripheral flange of each of the first and second pipes;

coupling structure for coupling said first ends of said first and second retaining members together; and, a latching mechanism for coupling said second ends of said first and second retaining members together and moving said second ends toward one another, said latching mechanism including a pivotal member coupled to said second end of said first retaining member and having a locking device threadedly associated with said pivotal member which is adapted to engage a portion of said second end of said second retaining member for effecting movement of said second ends of said first and second retaining members toward one another, said latching mechanism further including a containment member for receiving an intermediate portion of said locking device, said containment member acting to releasably maintain said pivotal member in a closed position and said locking device in a locked position when said locking device is positioned to securely couple the flanges of the first and second pipes to one another.

2. A device as set out in claim 1, wherein said containment member is fixedly connected to said second retaining member intermediate said first and second ends of said second retaining member.

3. A device as set out in claim 2, wherein said containment member has a generally arcuate shape and extends out from said second retaining member.

4. A device as set out in claim 3, wherein said containment member has a slot located in the end opposite to said second retaining member for receiving said intermediate portion of said locking device.

5. A device as set out in claim 4, wherein said locking device comprises:

a threaded bolt having a threaded section a portion of which defines said intermediate portion of said locking device and a proximal head section, said head section including a slot;

a gripping portion having a bore through which said threaded section of said bolt extends and a recess which communicates with said bore and receives said head section of said bolt;

a spring positioned in said recess and interposed between a section of said gripping portion and said head section of said bolt for biasing said head section in a direction away from said bore; and a pin received in said slot in said head section for preventing said bolt from completely exiting said gripping portion.

6. A device as set out in claim 5, wherein a recess is defined about said slot in said containment member for receiving an outer shoulder portion of said gripping portion.

7. A device as set out in claim 5, wherein said pivotal member comprises a link assembly.

8. A device as set out in claim 7, wherein said link assembly has first and second ends, said first end being pivotally coupled to said second end of said first retaining member via a first pin and said second end having a pivotable nut coupled thereto via second pins, said nut threadedly receiving said threaded section of said bolt.

9. A device as set out in claim 5, wherein said portion of said second end of said second retaining member comprises a recessed section adapted to receive a distal end of said threaded section of said bolt.

10. A device as set out in claim 1, wherein said coupling structure comprises a link pivotally connected to said first ends of said retaining members via first and second pins.

11. A device for coupling peripheral flanges of first and second pipes comprising:

first and second arcuate retaining members each having a first end, a second end, and an inner surface, said inner surface of each of said retaining members receiving portions of the peripheral flanges of the first and second pipes;

coupling structure for coupling said first ends of said first and second retaining members together; and a latching mechanism for coupling said second ends of said first and second retaining members together and moving said second ends toward one another, said latching mechanism including a pivotal member coupled to said second end of said first retaining member and having a locking device threadedly associated with said pivotal member which is adapted to engage a portion of said second end of said second retaining member for effecting movement of said second ends of said first and second retaining members toward one another, said latching mechanism further including a containment member for releasably receiving a first intermediate portion of said locking device when said pivotal member has been moved toward said second retaining member and for releasably receiving a second intermediate portion of said locking device when said locking device is moved to a locking position such that the flanges of the first and second pipes are securely coupled to one another.

12. A device as set out in claim 11, wherein said containment member is fixedly connected to said second retaining member intermediate said first and second ends of said second retaining member.

13. A device as set out in claim 12, wherein said containment member has a generally arcuate shape and extends out from said second retaining member.

14. A device as set out in claim 13, wherein said containment member has a slot located in the end opposite to said second retaining member for receiving said first intermediate portion of said locking device.

15. A device as set out in claim 14, wherein said locking device comprises:

a threaded bolt having a threaded section a portion of which defines said first intermediate portion of said locking device and a proximal head section, said head section including a slot;

a gripping portion having a bore through which said threaded section of said bolt extends and a recess which communicates with said bore and receives said head section of said bolt;

a spring positioned in said recess and interposed between a section of said gripping portion and said head section of said bolt for biasing said head section in a direction away from said bore; and a pin received in said slot in said head section for preventing said bolt from completely exiting said gripping portion.

16. A device as set out in claim 15, wherein a recess is defined about said slot in said containment member for receiving an outer shoulder portion of said gripping portion, said outer shoulder portion defining said second intermediate portion of said locking device.

17. A device as set out in claim 15, wherein said pivotal member comprises a link assembly.

18. A device as set out in claim 17, wherein said link assembly has first and second ends, said first end being pivotally coupled to said second end of said first retaining member via a first pin and said second end having a pivotable nut coupled thereto via second pins, said nut threadedly receiving said threaded section of said bolt.

19. A device as set out in claim 15, wherein said portion of said second end of said second retaining member comprises a recessed section adapted to receive a distal end of said threaded section of said bolt.

20. A device as set out in claim 11, wherein said coupling structure comprises a link pivotally connected to said first ends of said retaining members via first and second pins.

* * * * *